UNITED STATES PATENT OFFICE.

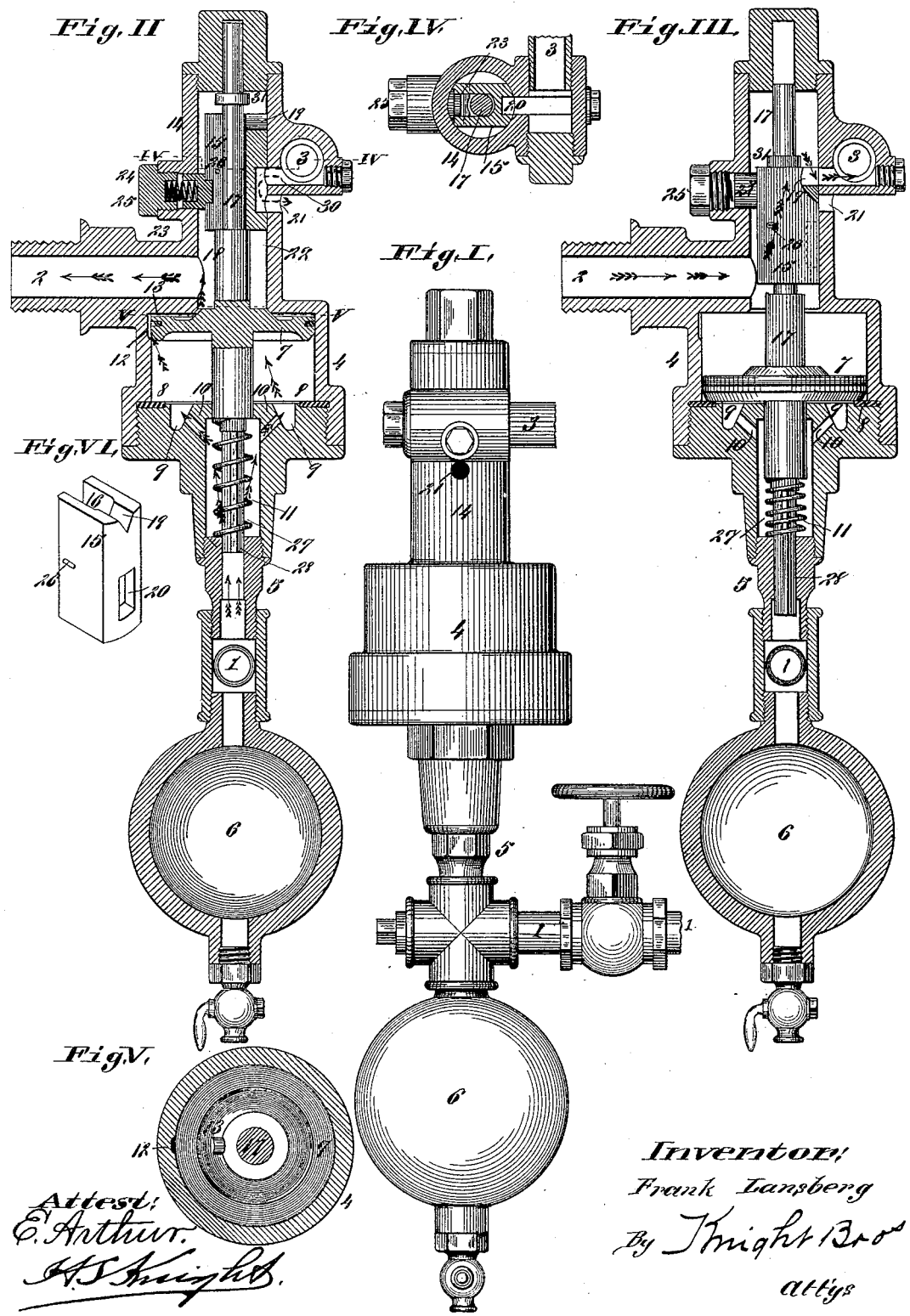

FRANK LANSBERG, OF ST. LOUIS, MISSOURI, ASSIGNOR OF ONE-HALF TO THOMAS INGLIS, OF SAME PLACE.

AIR-BRAKE.

SPECIFICATION forming part of Letters Patent No. 386,640, dated July 24, 1888.

Application filed January 24, 1888. Serial No. 261,762. (No model.)

*To all whom it may concern:*

Be it known that I, FRANK LANSBERG, of the city of St. Louis, in the State of Missouri, have invented a certain new and useful Improvement in Air-Brakes, of which the following is a full, clear, and exact description, reference being had to the accompanying drawings, forming part of this specification, and in which—

Figure I is a side elevation illustrating my improvement. Fig. II is a longitudinal section. Fig. III is a similar view showing the parts in the position they occupy when the brakes are set, Fig. II showing them in the position they occupy when the brakes are released. Fig. IV is a transverse section taken on line IV IV, Fig. II. Fig. V is a transverse section taken on line V V, Fig. II. Fig. VI is an enlarged perspective view of what I will term the "cut-off valve" removed.

My invention relates to an improvement in automatic air-brakes; and my invention consists in features of novelty hereinafter fully described, and pointed out in the claims.

Referring to the drawings, 1 represents what is known as the "train-pipe" of an air-brake system, and 2 represents the pipe leading to an air-receiver beneath the car. The train-pipe communicates with the main receiver.

3 represents the pipe leading to the brake-cylinder.

I have not shown in this application the main receiver, as it forms no part of this invention; but such a receiver is shown in my application filed herewith and identified as Case A, Serial No. 261,760; neither have I shown in this application the brake-cylinders, as they form no part of my invention, and are likewise shown in said application.

Air from the pipe 1 passes through a cylinder or housing, 4, connected to the pipe 1 by a pipe, 5, which may be provided with a drip-cup, 6. Within the housing or cylinder 4 is a piston-valve, 7, which seats when in its lower position at 8 against the bottom of the cylinder. The bottom of this cylinder has an annular groove, 9.

10 represents ports leading from the hollow neck 11 of the cylinder-head to the groove 9.

The air passes, as indicated by the arrows, from the pipe 1 through the pipe 5, through the hollow neck 11, through the ports 10, through the groove 9, and into the cylinder 4. It then passes through a port, 12, between the piston-valve and the side of the housing, and through a like groove, 13, between the upper face of the piston and the top of the cylinder or housing, and from here it passes, as indicated by the arrows, through the pipe 2 to the air-receiver beneath the car. Located over the cylinder or housing is a hollow extension or pipe, 14, in which is located a cut-off valve, 15. This valve is preferably formed in book shape, as shown in Fig. VI, with an opening, 16, which fits around the extended stem 17 of the piston-valve 7 above a shoulder, 18. In the back of this valve is a notch, 19, preferably V-shaped, and a recess or opening, 20. The opening 20 forms a communication between the pipe 3, leading to the brake-cylinder and the exhaust 21 when the cut-off valve is in its raised or elevated position, as shown in Fig. II, and when this valve is pulled down the opening 20 is moved beneath the exhaust, as shown in Fig. III, and the notch 19 is brought into communication with the pipe 3. The valve is held tightly against the wall 22 of the projection or pipe 14 on the cylinder by means of a plug, 23, fitting against the valve and extending into the opening 16. The plug is held against the valve by a spring, 24, fitting in a screw-cap, 25.

26 represents a pin, which may be passed through the valve to hold it on the stem 17 while the parts are being inserted.

27 represents a spring surrounding the downwardly-extending stem 28 of the valve 7, and which has a tendency to raise or lift the valve 7.

The operation is as follows: When the brakes are not set, the air passes from the main receiver through the train-pipe 1, and, as indicated by the arrows, up through the cylinder 4 and into the pipe 2, leading to the receiver beneath the cars, as already described, and also fills the hollow extension 14 of the cylinder or housing. At this time the valve 7 is in its elevated or raised position, as shown in Fig. II. Now, if the brakes are to be applied, the valve usually employed for this purpose (which is not shown in this application, but which is shown in an application filed by me herewith and identified as Case B, Serial No. 261,761) is opened to allow the air to exhaust from the train-pipe 1. As this takes place, the air above the valve 7 forces the valve down, closing the port 12, and as the downward movement of the piston continues the valve 15 is carried downward until the notch 19 is brought opposite the port 30, leading to the pipe 3 of the brake cylinder. The air then escapes into the pipe 3 and the brakes are applied. The cut-off valve 15 is carried down by the valve 7 by means of the stem 17 and a collar, 31, on the stem above the valve 15, and it will be observed that there is a space between the valve 15 when in its upper position and the collar 31. The object of this is to allow the valve 7 to move far enough to close the port 12 before the valve 15 commences to open.

When the brakes are to be released, the valve, which has been operated to allow the air to escape from the train-pipe, is moved in the other direction, and the air from the main receiver passes through the pipe 1 and forces the piston-valve 7 back to the position shown in Fig. II, and, as it does so, closes the pipe 3 by valve 15 and allows the air to exhaust, as shown by dotted arrow in Fig. II.

By allowing the valve 7 to move a greater or less distance just as much air as is desired may be allowed to pass from the pipe 2 to the pipe 3 through the groove 19, and any amount of pressure desired may be given to the brakes.

The stem 28 of the piston-valve 7 forms a lower guide for the valve and causes it to move concentrically in the cylinder.

I claim as my invention—

1. In an air-brake, the combination of the train-pipe, receiver-pipe, and brake-cylinder pipe, piston-valve located in a cylinder or housing, through which air passes from the train-pipe to the air-receiver pipe, and a sliding cut-off located on the stem of said valve and provided with a V-shaped notch extending from the top downward, whereby it coincides with said brake-pipe with its apex first, and opening 20, substantially as and for the purpose set forth.

2. In an air-brake, the combination of the train-pipe, air-receiver pipe, cylinder or housing forming a communication between the train-pipe and air-receiver pipe, and having a hollow upward extension, valve located in said cylinder, stem extending upwardly from said valve, a cut-off valve on said stem, having a longitudinal and transverse opening and a notch in its upper end, a plug resting in said longitudinal opening, and a spring bearing upon said plug, substantially as and for the purpose set forth.

3. In an air-brake, the combination of the train-pipe, air-receiver pipe, and pipe leading to the brake-cylinder, chamber located between the train-pipe and receiver-pipe, piston-valve located in said chamber and having an upwardly-extending stem, cut-off valve located on said stem, provided with a longitudinal and a transverse opening and a notch extending from the top downward, a spring-plug for forcing the cut-off valve against the wall of the hollow extension, and a screw-cap for compressing said spring, substantially as and for the purpose set forth.

4. In an air-brake, the combination, with the train-pipe 1 and cylinder 4, having the ports 12 13 and the groove 9 in its bottom, of the hollow neck connected to said cylinder, and having ports 10 extending into said groove, a piston-valve in said cylinder, the hollow extension 14, extending from said cylinder axially with said neck and having the ports 21 30, a stem projecting in both directions from said piston into said extension and neck, the pipe 5, receiving said stem and forming communication between the pipe 1 and neck 11, a spring surrounding said stem and bearing upon said pipe, and a slide valve on said stem in said extension, having the notch 19 and opening 20, substantially as set forth.

5. In an air-brake, the combination of the train-pipe, receiver-pipe, and brake-cylinder pipe, piston-valve located in the cylinder or housing, through which the air passes from the train-pipe to the air-receiver pipe, the hollow extension 14 and neck 11, projecting from said valve-cylinder, stems projecting from said piston-valve into said extension and neck, a spring surrounding one of said stems for holding said valve in one direction, and the pipe 5 in said neck, forming a guide for the stem therein, and also communication between the train-pipe and said neck, substantially as set forth.

FRANK LANSBERG.

In presence of—
GEO. H. KNIGHT,
EDWD. S. KNIGHT.